United States Patent
Lou et al.

(10) Patent No.: US 10,348,680 B2
(45) Date of Patent: Jul. 9, 2019

(54) UDP-BASED CONTROL COMMAND TRANSMISSION METHOD, SENDER AND RECEIVER

(71) Applicant: Beijing Xiaoniao Tingting Technology Co., LTD., Beijing (CN)

(72) Inventors: Xiaolei Lou, Beijing (CN); Xiaobo Zeng, Beijing (CN); Binbin Jiang, Beijing (CN)

(73) Assignee: Beijing Xiaoniao Tingting Technology Co., Ltd., Beijing (CN)

( * ) Notice: Subject to any disclaimer, the term of this patent is extended or adjusted under 35 U.S.C. 154(b) by 117 days.

(21) Appl. No.: 15/299,015

(22) Filed: Oct. 20, 2016

(65) Prior Publication Data
US 2017/0111316 A1    Apr. 20, 2017

(30) Foreign Application Priority Data
Oct. 20, 2015 (CN) .......................... 2015 1 0685581

(51) Int. Cl.
| | |
|---|---|
| *H04L 29/12* | (2006.01) |
| *H04L 12/931* | (2013.01) |
| *H04L 29/06* | (2006.01) |
| *H04L 5/00* | (2006.01) |
| *H04L 29/08* | (2006.01) |

(52) U.S. Cl.
CPC ........ *H04L 61/6063* (2013.01); *H04L 5/0055* (2013.01); *H04L 49/201* (2013.01); *H04L 67/104* (2013.01); *H04L 69/164* (2013.01); *H04L 69/28* (2013.01); *H04L 61/6068* (2013.01)

(58) Field of Classification Search
CPC ............ H04L 61/6063; H04L 61/6068; H04L 5/0055; H04L 67/104; H04L 69/28; H04L 49/201
See application file for complete search history.

(56) References Cited

U.S. PATENT DOCUMENTS

| | | | |
|---|---|---|---|
| 6,243,751 B1 * | 6/2001 | Chatterjee | H04L 67/14 709/226 |
| 6,263,001 B1 | 7/2001 | Banks | |
| 2007/0064718 A1 * | 3/2007 | Ekl | H04L 12/1868 370/432 |

(Continued)

FOREIGN PATENT DOCUMENTS

| | | |
|---|---|---|
| CN | 102957730 A | 3/2013 |
| CN | 104394234 A | 3/2015 |

(Continued)

OTHER PUBLICATIONS

Supplementary European Search Report in European application No. 16194772.6, dated Jan. 20, 2017.

(Continued)

*Primary Examiner* — Hoang-Chuong Q Vu
(74) *Attorney, Agent, or Firm* — Mintz Levin Cohn Ferris Glovsky and Popeo, P.C.; Kongsik Kim; Derek E. Constantine

(57) ABSTRACT

Provided is a User Datagram Protocol (UDP)-based control command transmission method, in which a sender sends a control command packet to a receiver based on a UDP; and the receiver sends an Acknowledgement (ACK) packet to the sender based on the UDP after receiving the control command packet. A sender and a receiver are also provided.

17 Claims, 3 Drawing Sheets

(56) References Cited

U.S. PATENT DOCUMENTS

| | | | | |
|---|---|---|---|---|
| 2007/0097969 A1* | 5/2007 | Regnier | ................ | H04L 41/00 370/390 |
| 2010/0014520 A1 | 1/2010 | Matsumoto | | |
| 2011/0238792 A1* | 9/2011 | Phillips | ................ | G06F 15/177 709/220 |
| 2014/0029620 A1* | 1/2014 | Zheng | ................ | H04L 1/1607 370/392 |
| 2014/0122565 A1* | 5/2014 | Subramanian | ...... | H04L 41/5096 709/203 |
| 2014/0180487 A1* | 6/2014 | Bull | ........................ | H04L 12/12 700/295 |
| 2015/0204964 A1* | 7/2015 | Hirano | ...................... | G01S 5/12 370/252 |
| 2016/0063964 A1* | 3/2016 | Verma | .................... | G09G 5/363 345/582 |
| 2016/0173238 A1* | 6/2016 | Naaman | .................... | H04L 1/08 714/749 |
| 2016/0197736 A1* | 7/2016 | Shvarzberg | ......... | H04L 12/6418 713/310 |

FOREIGN PATENT DOCUMENTS

| | | |
|---|---|---|
| CN | 104901889 A | 9/2015 |
| WO | 9851052 A1 | 11/1998 |

OTHER PUBLICATIONS

Deering Stanford University S: "Host Extensions for IP Multicasting; rfc1112.txt", Host Extensions for IP Multicasting; RFC1112.TXT, Internet Engineering Task Force, IETF; Standard, Internet Society (ISOC) 4, Rue Des Falaises CH-1205 Geneva, Switzerland, Aug. 1, 1989.

\* cited by examiner

UDP-BASED CONTROL COMMAND TRANSMISSION METHOD, SENDER AND RECEIVER

CROSS-REFERENCE TO RELATED APPLICATIONS

The present application is based on, and claims priority from, Chinese Application No. 201510685581.1, filed on Oct. 20, 2015, the disclosure of which is incorporated by reference herein in its entirety.

TECHNICAL FIELD

The present disclosure relates generally to the field of data transmission, and more particularly, to a User Datagram Protocol (UDP)-based control command transmission method, sender and receiver.

BACKGROUND

Along with accumulation of social wealth and acceleration of the pace of life, people have higher requirements on high and fast life quality. Beautiful music is an indispensable part in life. Loudspeaker boxes, as generation sources of music, are widely used in life, work, study and entertainment. In a multi-room playing mode of loudspeaker boxes, a master playing loudspeaker box is required to transmit current playing information to a slave playing loudspeaker box with existence of a master-slave playing relationship, so that real-time reliable transmission is required. UDP-based transmission is always adopted in the industry. However, the UDP-based data transmission manner is connectionless-oriented, and a sending party may send data without negotiation with a receiving party. During reception, UDP of the receiving party may not send an Acknowledgement (ACK) to the sending party, which may cause shutdown of the receiving party which is too busy. Therefore, UDP-based transmission with the advantage of high efficiency is poorer in security and reliability and high in packet loss rate.

The inventor of the present disclosure realizes that the problem of poorer security and reliability of UDP-based transmission in a small data control instruction transmission process has yet not been pertinently solved for the above-mentioned shortcomings of UDP-based transmission by an existing data transmission method.

SUMMARY

A purpose of the present disclosure is to provide a novel technical solution for reliably transmitting a small data control instruction based on a UDP.

According to an aspect of the present disclosure, a UDP-based control command transmission method is provided, which may include the following steps:

Step 1: a sender sends a control command packet to a receiver based on a UDP; and Step 2: the receiver sends an ACK packet to the sender based on the UDP after having successfully received the control command packet.

Preferably, Step 1 may further include that the sender appends a command Identifier (ID) which uniquely identify the control command packet into the control command packet for sending; and Step 2 may further include that the receiver appends the command ID consistent with that in the received control command packet into the ACK packet for sending.

Preferably, the sender may perform Peer-to-Peer (P2P) sending to one or more receivers, and Step 1 may include that: (an) Internet Protocol (IP) address(es) or IP address list(s) of the receiver(s) is/are acquired, and the control command packet is sent to the IP address(es) of the one or more receivers; and Step 2 may include that: an IP address of the sender corresponding to the received control command packet is acquired, and the ACK packet is sent to the address.

Preferably, during P2P sending, the method may further include: Step 3: when the sender receives the ACK packet from the receiver within a preset time period, it is decided that a command is successfully sent, and when the sender does not receive the ACK packet from the receiver within the preset time period, the control command packet is resent to the receiver; and Step 4: when the sender does not receive the ACK packet after sending the control command packet to the receiver for N times, it is decided that the command sending to the receiver is failed.

Preferably, the sender may perform broadcast or multicast sending to the receiver, and Step 1 may further include that the sender appends a group ID into the control command packet for sending; and Step 2 may further include that the receiver appends a group ID consistent with that in the received control command packet into the ACK packet for sending.

Preferably, during broadcast or multicast sending, Step 1 may further include that: a broadcast or multicast group address is acquired, and the control command packet is sent in a broadcast or multicast manner; and Step 2 may include that: each receiver, which has received the control command packet in a group, acquires the IP address of the sender or the broadcast or multicast group address corresponding to the received control command packet, and sends an ACK packet to the address or the broadcast or multicast group address.

Preferably, during broadcast or multicast sending, the method may further include: Step 3: when the sender receives the ACK packets from all the receivers within a preset time period, it is decided that the command is successfully sent, and when the sender does not receive the ACK packets from all the receivers within the preset time period, the control command packet is resent in the broadcast or multicast manner; and Step 4: when the sender does not receive the ACK packets from all the receivers after sending the control command packet in the broadcast or multicast manner for N times, it is decided that the command sending to a receiver which fails in reception is failed.

According to another aspect of the present disclosure, a UDP-based control command sender is provided, which may include a sending module and receiving module arranged in the sender, wherein the sending module may be configured to send a control command packet to a receiver based on a UDP, and the receiving module may be configured to receive a UDP-based ACK packet from the receiver.

Preferably, the sending module may further be configured to append command IDs which uniquely identify each control command packet into the control command packet for sending.

Preferably, the sending module may further be configured to perform P2P sending to one or more receivers, acquire (an) IP address(es) or IP address list(s) of the receiver(s), and send the control command packet to the IP address(es) of the one or more receivers; the sending module may further be configured to, when failing to receive the ACK packet from the receiver within a preset time period, resend the control command packet to the receiver; and the receiving module may further be configured to, when receiving the ACK packet from the receiver within the preset time period, decide that a command is successfully sent, and when failing to receive the ACK packet after sending the control command packet to the receiver for N times, decide that the command sending to the receiver is failed.

Preferably, the sending module may further be configured to perform broadcast or multicast sending to multiple receivers, and append a group ID into the control command packet for sending; the sending module may further be configured to acquire a broadcast or multicast group address, and send the control command packet in a broadcast or multicast manner; the sending module may further be configured to, when failing to receive ACK packets from all the receivers within a preset time period, resend the control command packet in the broadcast or multicast manner; and the receiving module may further be configured to, when receiving the ACK packets from all the receivers within the preset time period, decide that the command is successfully sent, and when the sender does not receive the ACK packets from all the receivers after sending the control command packet in the broadcast or multicast manner for N times, decide that the command sending to the receiver which fails in reception is failed.

According to another aspect of the present disclosure, a UDP-based control command receiver is provided, which may include a sending module and receiving module arranged in the receiver, wherein the receiving module may be configured to receive a control command packet from a sender; and the sending module may be configured to send an ACK packet to the sender.

Preferably, the sending module may further be configured to append a command ID consistent with that in the received control command packet into the ACK packet for sending.

Preferably, the sending module may further be configured to, during P2P sending, acquire an IP address or a list of IP addresses of the sender corresponding to the received control command packet and send the ACK packet to the address or the list of addresses.

Preferably, the sending module may further be configured to, during broadcast or multicast sending, acquire and append a group ID consistent with that in the received control command packet, append the group ID into the ACK packet, acquire the IP address of the sender or a broadcast or multicast group address corresponding to the received control command packet, and send the ACK packet to the address or the broadcast or multicast group address.

The inventor of the present disclosure finds that there is yet no technology for pertinently solving the problems of poorer security and reliability in a small data control instruction transmission process for the abovementioned shortcomings of UDP-based transmission in the prior art. Therefore, the technical task to be executed or the technical problem to be solved by the present disclosure has never been considered or expected by those skilled in the art, and the present disclosure is a novel technical solution.

In addition, those skilled in the art should appreciate that the technical solutions of each embodiment or claim of the present disclosure may be improved in only one or more terms and it is unnecessary to solve all the technical problems listed in the prior art or the background although the prior art has many problems. Those skilled in the art should appreciate that contents not mentioned in a claim are not intended to limit the claim.

Exemplary embodiments of the present disclosure will be described below with reference to the drawings to make clear the other characteristics and advantages of the present disclosure.

BRIEF DESCRIPTION OF THE DRAWINGS

The accompanying drawings, which are incorporated in and constitute a part of this specification, illustrate embodiments of the present disclosure and, together with the specification, serve to explain the principles of the present disclosure.

DETAILED DESCRIPTION

Various exemplary embodiments of the present disclosure will now be described with reference to the drawings in detail. It should be noted that: relative arrangement, number expressions and numerical values of parts and steps elaborated in these embodiments are not intended to limit the scope of the present disclosure unless otherwise specifically described.

Descriptions made below about at least one exemplary embodiment are only illustrative and not intended to form any limit to the present invention and application or use thereof.

Technologies, methods and equipment known by those skilled in the art may not be discussed in detail, but the technologies, the methods and the equipment shall be considered as a part of the specification under a proper condition.

In all examples shown and discussed here, any specific value is only exemplary and not intended to form limits Therefore, other examples of the exemplary embodiments may adopt different values.

It should be noted that: similar reference signs and letters represent similar items in the following drawings, so that a certain item is not required to be further discussed in subsequent drawings once being defined in a drawing.

A control command transmission method according to an embodiment of the present disclosure is applied to an embedded hardware platform, and reliable and real-time transmission of a command is designed and implemented. A command is transmitted to each receiver in real time based on a UDP. The method, equipment and application thereof of the present disclosure may be implemented on various network interfaces, for example, Ethernet, Wireless Fidelity Station (WiFi-STA) (in a conventional STA mode for connection to an Access Point (AP), data is forwarded by the AP), WiFi-P2P (for a Group Owner (GO) and Group Client (GC) of WiFi-direct, the GO pushes data to the GC), and WiFi-AP (master equipment serves as an independent AP, slave equipment is connected to the master equipment as an STA, and the master equipment pushes a command to the slave equipment). Supported data dissemination forms include: broadcast, multicast, P2P UDP sending, and a proper transmission form may be dynamically regulated and selected according to a practical condition of a network.

Figure 1:
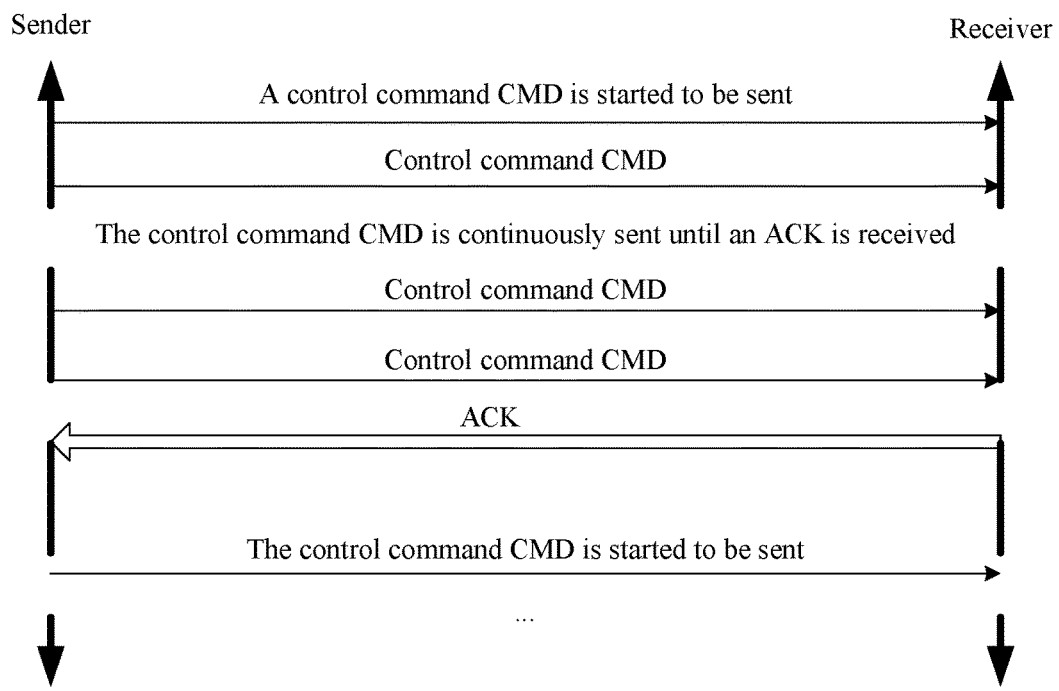
FIG. 1 is a diagram of a UDP-based control command transmission flow, according to an embodiment of the present disclosure.

According to a first embodiment of the present disclosure, a UDP-based control command transmission method shown in FIG. 1 includes the following steps: Step 1: a sender sends a control command packet to a receiver based on a UDP; and Step 2: the receiver sends an ACK packet to the sender based on the UDP after receiving the control command packet.

UDP-based transmission is adopted in the present disclosure. The UDP is connectionless-oriented. Due to its transmission layer mechanism, a sending party may send data without negotiation with the receiving party and the receiving party may return an ACK signal without resource pre-allocation. Therefore, the control command packet of the present disclosure is usually suitable for small-data-volume transmission, few hardware resources are occupied by reception and instruction processing, and meanwhile, the data transmission reliability is improved to a certain extent.

Figure 2:
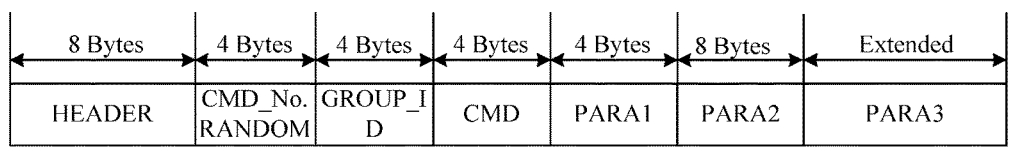
FIG. 2 is a structure diagram of a control command packet, according to an embodiment of the present disclosure.
Figure 3:
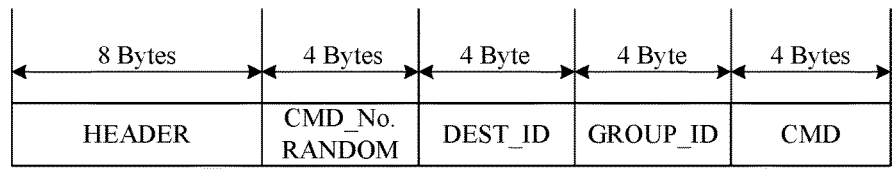
FIG. 3 is a structure diagram of an ACK packet, according to an embodiment of the present disclosure.

Preferably, the structure of the control command packet sent by the sender is shown in FIG. 2, and an example of the structure of the ACK packet fed back to the sender by the receiver is shown in FIG. 3. Those skilled in the art may configure a proper control command packet structure and ACK packet structure as required.

In the structure of the control command packet:

HEADER: includes totally 8 bytes, is a mark of the transmission method and may also be configured to filter a valid protocol packet;

CMD_No.RANDOM: includes 4 bytes, is a unique mark of this command and is mainly configured to judge the specific command which is successfully received when the ACK packet is received;

GROUP_ID: includes 4 bytes, is a group ID to which the current command is to be sent and mainly distinguishes different groups during broadcast or multicast; and CMD: includes 4 bytes and is a command body.

In the structure of the ACK packet:

HEADER: includes totally 8 bytes, is a mark of the transmission method and may also be configured to filter a valid protocol packet;

CMD_No.RANDOM: includes 4 bytes, is a mark of the currently received command, is received from the sender and is configured to confirm the specific command corresponding to an ACK at the sender;

DEST_ID: includes 4 bytes, is a unique identifier (ID) of the receiver, is configured to mark the receiver which sends the ACK and is usually adopted for a broadcast or multicast transmission manner, and the sender may distinguish the receiver which sends the ACK by virtue of DEST_ID after receiving the ACK;

GROUP_ID: includes 4 bytes and is a current group ID, and the sender may filter a valid control packet in the group by virtue of the field; and CMD: includes 4 bytes, is a successfully received command body and corresponds to CMD_No.RANDOM one to one.

Particularly, Step 1 further includes that the sender appends a command ID CMD_No.RANDOM which uniquely identify each control command packet into the control command packet for sending; and Step 2 further includes that the receiver appends a command ID CMD_No.RANDOM consistent with that in the received control command packet into the ACK packet for sending. Therefore, it facilitates the sender to identify which control command is successfully received.

According to the application of the present disclosure, two application scenarios, i.e., P2P sending and broadcast or multicast sending, may be involved.

In a P2P sending scenario, Step 1 includes that: (an) IP address(es) or IP address list(s) of the receiver(s) is/are acquired, and the control command packet is sent to the IP address(es); and Step 2 includes that: an IP address of the sender corresponding to the received control command packet is acquired, and the ACK packet is sent to the address.

When the sender receives the ACK packet sent by the receiver within a preset time period, it is decided that a command is successfully sent, and when the sender does not receive the ACK packet sent by the receiver within the preset time period, the control command packet is resent to the receiver; and when the sender does not receive the ACK packet after sending the control command packet to the receiver for N times, it is decided that the command is failed to be sent to the receiver.

In the broadcast or multicast sending scenario, Step 1 further includes that the sender appends a group ID GROUP_ID into the control command packet for sending, acquires a broadcast or multicast group address, and sends the control command packet in a broadcast or multicast manner; and the receiver appends a group ID GROUP_ID consistent with that in the received control command packet in the ACK packet for sending, and each receiver receiving the control command packet in a group acquires the IP address of the sender or the broadcast or multicast group address corresponding to the received control command packet, and sends ACK packets to the address or the broadcast or multicast group address, that is, the ACK packets may be sent in the broadcast or multicast manner and then the sender may distinguish the receiver which sends an ACK by virtue of DEST_ID after receiving the ACK.

When the sender receives the ACK packets sent by all the receivers within a preset time period, it is decided that the command is successfully sent, and when the sender does not receive the ACK packets sent by all the receivers within the preset time period, the control command packet is resent in the broadcast or multicast manner; and when the sender does not receive the ACK packets sent by all the receivers after sending the control command packet in the broadcast or multicast manner for N times, it is decided that the command is failed to be sent to a receiver which fails in reception.

According to another embodiment of the present disclosure, a UDP-based control command sender 100 and a UDP-based control command receiver 200 are provided. The sender 100 includes a sending module 1001 and receiving module 1002 arranged in the sender, the sending module 1001 is configured to send a control command packet to a receiver based on a UDP, and the receiving module 1002 is configured to receive a UDP-based ACK packet from the receiver. The receiver 200 includes a sending module 2001 and receiving module 2002 arranged in the receiver, the receiving module 2002 is configured to receive the control command packet from the sender, and the sending module 2001 is configured to send the ACK packet to the sender.

In the sender 100, the sending module 1001 appends the command ID CMD_No.RANDOM which uniquely identify each control command packet into the control command packet for sending. In the receiver 200, the sending module 2001 appends a command ID consistent with the received control command packet into the ACK packet for sending.

According to the application of the present disclosure, two application scenarios, i.e., P2P sending and broadcast or multicast sending may be involved.

Figure 4:
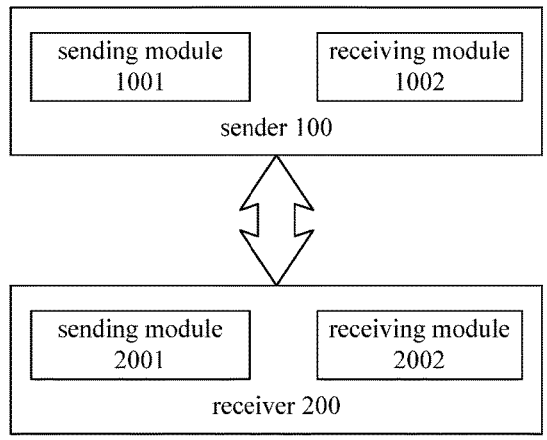
FIG. 4 is a block diagram of a sender and a receiver and a diagram of P2P transmission of a control command, according to an embodiment of the present disclosure.

In a P2P sending scenario, as shown in FIG. 4, the sending module 1001 in the sender 100 implements P2P sending to the receiver, acquires an IP address of the receiver, and sends the control command packet to the IP address. The sending module 2001 in the receiver 200, during P2P sending, acquires an IP address of the sender corresponding to the received control command packet, and sends the ACK packet to the address.

The sending module 1001 in the sender 100 is further configured to, when failing to receive the ACK packet from the receiver within a preset time period, resend the control command packet to the receiver; and the receiving module 1002 is further configured to, when receiving the ACK packet from the receiver within the preset time period, decide that a command is successfully sent, and when failing to receive the ACK packet after the control command packet has been sent to the receiver for N times, decide that the command sending is failed.

Optionally, during P2P sending, for a control command required to be sent by the sender 100, there may be multiple receivers 200. Under such a condition, the sending module of the sender 100 is required to acquire a list of IP addresses of the multiple receivers and send the control command packet to the multiple receivers.

Figure 5:
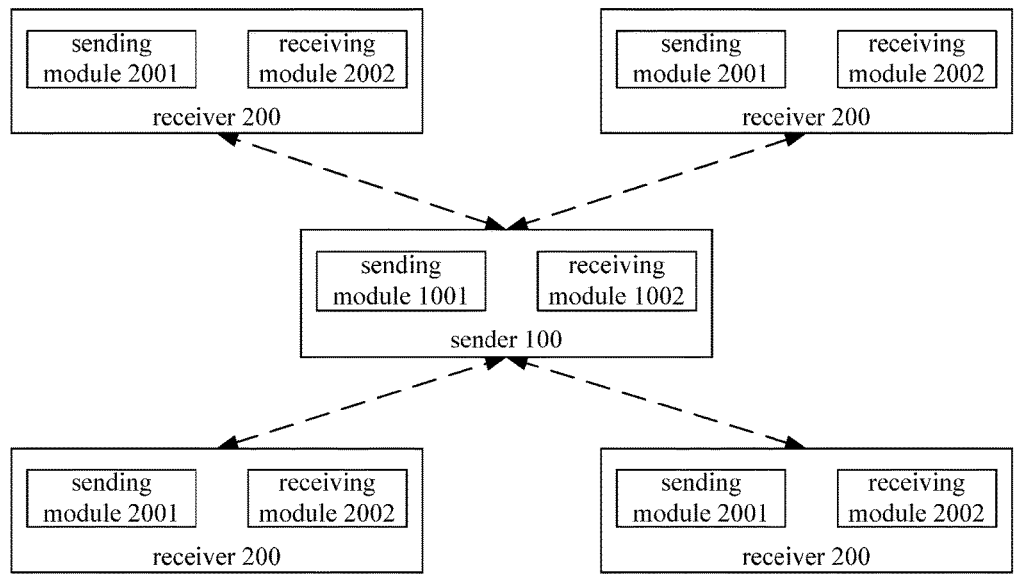
FIG. 5 is a block diagram of a sender and a receiver and a diagram of broadcast or multicast transmission of a control command, according to an embodiment of the present disclosure.

In the broadcast or multicast sending scenario, as shown in FIG. 5, there are one sender 100 and multiple receivers 200. The sending module 1001 in the sender 100 implements broadcast or multicast sending to the multiple receivers, appends a group ID GROUP_ID into the control command packet for sending, acquires a broadcast or multicast group address, and sends the control command packet in a broadcast or multicast manner. The sending modules 2001 in the receivers 200, during broadcast or multicast sending, acquire a group ID GROUP_ID consistent with that in the received control command packet, append the group ID into ACK packets for sending, acquire the IP address of the sender or the broadcast or multicast group address corresponding to the received control command packet, and send the ACK packets to the address or the broadcast or multicast group address.

The sending module 1001 in the sender 100, when failing to receive the ACK packets from all the receivers within a preset time period, resends the control command packet in the broadcast or multicast manner; and the receiving module 1002, when receiving the ACK packets from all the receivers 200 within the preset time period, decides that the command is successfully sent, and when the sender does not receive the ACK packets from all the receivers within the preset time period, decides that the command sending to the receiver(s) which fail(s) in reception is failed.

The sender 100 and receiver 200 of the embodiment may be various kinds of intelligent equipment such as loudspeaker boxes and multimedia players, and are particularly applicable to the condition that a master playing device for playing in a multi-room playing mode transmits a control command and playing information to a slave playing device. With adoption of a UDP-based transmission manner, the advantages of simplicity and real-time performance of a UDP are maintained; and meanwhile, the step that the receiver sends an acknowledgement to the sender is added, so that transmission reliability is improved, and multiple receivers may be supported. The embodiment is particularly suitable for small-data-volume P2P and broadcast or multicast control command transmission, and compared with adoption of a Transmission Control Protocol (TCP)-based manner, has the advantages that resource occupation rate is lowered, and meanwhile, transmission efficiency and reliability are improved.

Those skilled in the art should appreciate that the sender 100 and the receiver 200 may be implemented in various manners. For example, each unit and module may be implemented by an instruction configuration processor. For example, instructions may be stored in a Read-Only Memory (ROM), and when equipment is started, the instructions are read into a programmable device from the ROM to implement each unit and module. For example, each unit and module may be solidified into a specific device (such as an Application Specific Integrated Circuit (ASIC)). Each unit may be independent, or they may be combined for implementation. The units may be implemented in one of the abovementioned implementation manners, or may be implemented by combining two or more manners in the abovementioned implementation manners.

The system and method of the present disclosure may be embodied by a program product. The program product may include a readable storage medium on which readable program instructions configured to cause a processor to implement each aspect of the present disclosure are recorded.

The readable storage medium may be physical equipment capable of maintaining and storing instructions used by instruction execution equipment. The readable storage medium may be, not limited to, for example, electric storage equipment, magnetic storage equipment, optical storage equipment, electromagnetic storage equipment, semiconductor storage equipment or any proper combination thereof. A more specific example (non-exhaustive list) of the readable storage medium includes: a portable disk, a hard disk, a Random Access Memory (RAM), a ROM, an Erasable Programmable Read-Only Memory (EPROM or flash memory), a Static Random Access Memory (SRAM), a Compact Disc Read-Only Memory (CD-ROM), a Digital Video Disk (DVD), a memory stick, a floppy disk, mechanical coding equipment, a punched card storing instructions or raised structures in slots or any proper combination thereof. The readable storage medium adopted here is not explained as a transitory signal, for example, a radio wave or other freely propagated electromagnetic waves, electromagnetic waves propagated through waveguides or other transmission media (for example, light pulses passing through optical fiber cables), or electric signals transmitted through electric wires.

The readable program instructions described here may be downloaded to each piece of electronic equipment from the readable storage medium, or may be downloaded to external electronic equipment or external storage equipment through a network such as the Internet, a Local Area Network (LAN), a Wide Area Network (WAN) and/or a wireless network. The network may include a copper transmission cable, optical fiber transmission, wireless transmission, a router, a firewall, a switch, a gateway computer and/or an edge server. A network adapter card or network interface of each piece of electronic equipment receives the readable program instructions from the network, and forwards the readable program instructions for storage in readable storage media of each piece of computing/processing equipment.

The program instructions configured to execute operation of the present disclosure may be assembly instructions, Instruction Set Architecture (ISA) instructions, machine instructions, machine related instructions, microcodes, firmware instructions, state setting data or source codes or target codes compiled with one or any combination of multiple programming languages, and the programming languages include an object-oriented programming language such as Smalltalk and C++ and a conventional procedural programming language such as "C" language or a similar programming language. The readable program instructions may be completely executed on electronic equipment of a user, partially executed on the electronic user of the user, executed as an independent software package, partially executed on the electronic equipment of the user and partially executed on a remote computer, or completely executed on the remote computer or server. Under a condition where the remote computer is involved, the remote computer may be connected to the electronic equipment of the user through any type of network including a LAN or a WAN, or, may be connected to an external computer (for example, connected through the Internet by virtue of an Internet service provider). In some embodiments, an electronic circuit, such as a programmable logic circuit, a Field Programmable Gate Array (FPGA) or a Programmable Logic Array (PLA), is personally customized by virtue of state information of the readable program instructions, and the electronic circuit may execute a computer-readable program instruction, thereby implementing each aspect of the present disclosure.

Here, each aspect of the present disclosure is described with reference to the flowchart and/or block diagram of the method and device according to the embodiment of the present disclosure. It should be understood that each block of the flowchart and/or the block diagram and a combination of each block in the flowchart and/or the block diagram may be implemented by the readable program instructions.

These readable program instructions may be provided for a processor of the electronic equipment, thereby generating a machine capable of generating a device which implements functions/actions specified in one or more blocks in the flowchart and/or the block diagram when these instructions are executed by the processor of the electronic equipment. These readable program instructions may also be stored in the readable storage medium, and these instructions make the electronic equipment work in a specific manner, so that the readable medium storing the instructions includes a product, which includes instructions for implementing each aspect of the functions/actions specified in one or more blocks in the flowchart and/or the block diagram.

These readable program instructions may further be loaded onto the electronic equipment, so that a series of operating steps are executed on the electronic equipment to generate a process implemented by the instructions, and the functions/actions specified in one or more blocks in the flowchart and/or the block diagram are implemented by the instructions executed on the electronic equipment.

The flowchart and block diagram in the drawings show implementable system architectures, functions and operation of the devices and methods according to multiple embodiments of the present disclosure. In this regard, each block in the flowchart or the block diagram may represent a part of a module, a program segment or an instruction, and the part of the module, the program segment or the instruction includes one or more executable instructions configured to implement specified logic functions. In some alternative implementation, functions marked in the blocks may also be realized in a sequence different from that shown in the drawings. For example, two continuous blocks may actually be executed substantially in parallel, they may also be executed in a reverse sequence sometimes, and this is determined by involved functions. It is also important to note that each block in the block diagram and/or the flowchart and combinations of the blocks in the block diagram and/or the flowchart may be implemented by virtue of a specific hardware-based system which executes the specified functions or actions, or may be implemented by virtue of a combination of specific hardware and instructions. It is known by those skilled in the art that implementation in a hardware manner, implementation in a software manner and implementation in a combined software and hardware manner are equivalent.

Each embodiment of the present disclosure has been described above, and the descriptions made above are exemplary and non-exhaustive and are not limited to each disclosed embodiment. Many modifications and variations made without departing from the scope and spirit of each embodiment of the present disclosure are apparent to those skilled in the art. Selection of terms adopted in the present disclosure aims to best explain the principle of each embodiment, a practical application or improvements in technologies in the market, or make each disclosed embodiment of the present disclosure understood by others skilled in the art. The scope of the present disclosure is defined by the appended claims.

What is claimed is:

1. A User Datagram Protocol (UDP)-based control command transmission method, comprising:
a first step of sending, by a sender, a control command packet to a receiver based on a UDP in a broadcast or multicast manner; and
a second step of sending in the broadcast or multicast manner, by the receiver, an Acknowledgement (ACK) packet to the sender based on the UDP after having successfully received the control command packet to indicate that the control command packet was successfully received and appending, by the receiver, a unique identifier of the receiver into the ACK packet for sending such that, when the control command packet and the ACK packet are transmitted in the broadcast or multicast manner, the unique identifier of the receiver is configured to distinguish the receiver that sends the ACK packet.

2. The transmission method according to claim 1,
wherein the first step includes appending, by the sender, a command Identifier (ID) that uniquely identifies the control command packet into the control command packet for sending; and
wherein the second step includes appending, by the receiver, the command ID consistent with that in the received control command packet into the ACK packet for sending.

3. The transmission method according to claim 2, wherein the sender performs the sending to one or more receivers in a Peer-to-Peer (P2P) manner,
wherein the first step includes acquiring an Internet Protocol (IP) address of the receiver or a list of IP addresses of the receivers, and sending the control command packet to the IP address of each of the one or more receivers; and
wherein the second step includes acquiring an IP address of the sender corresponding to the received control command packet, and sending the ACK packet to the IP address of the sender.

4. The transmission method according to claim 3, further comprising:
a third step of, when the sender receives the ACK packet from the receiver within a preset time period, determining that command sending is successful, and when the sender does not receive the ACK packet from the receiver within the preset time period, resending the control command packet to the receiver; and a fourth step of, when the sender does not receive the ACK packet after sending the control command packet to the receiver for N times, determining that sending the control command packet to the receiver has failed.

5. The transmission method according to claim 2, wherein the first step includes appending, by the sender, a group ID into the control command packet for sending; and wherein the second step includes appending, by the receiver, the group ID consistent with that in the received control command packet into the ACK packet for sending.

6. The transmission method according to claim 5, wherein the first step includes acquiring a broadcast or multicast group address, and sending the control command packet in the broadcast or multicast manner; and wherein the second step includes acquiring, by each receiver that has received the control command packet in a group, the IP address of the sender or the broadcast or multicast group address corresponding to the received control command packet, and sending the ACK packet to the address or the broadcast or multicast group address.

7. The transmission method according to claim 6, further comprising:

a third step of, when the sender receives the ACK packets from all the receivers within a preset time period, determining that sending the control command packet is successful, and when the sender does not receive the ACK packets from all the receivers within the preset time period, resending the control command packet in the broadcast or multicast manner; and a fourth step of, when the sender does not receive the ACK packets from all the receivers after sending the control command packet in the broadcast or multicast manner for N times, determining that sending the control command packet to the one or more receivers that have not sent the ACK packets has failed.

8. A User Datagram Protocol (UDP)-based control command sender, comprising:

a memory; and a processor configured to execute a series of actions by performing instructions stored in the memory, including:

to send a control command packet to a receiver based on a UDP in a broadcast or multicast manner, and to receive a UDP-based Acknowledgement (ACK) packet sent in the broadcast or multicast manner that indicates that the control command packet was successfully received from the receiver and that contains a unique identifier of the receiver appended into the ACK packet such that, when the control command packet and the ACK packet are transmitted in the broadcast or multicast manner, the unique identifier of the receiver is configured to distinguish the receiver that sends the ACK packet.

9. The sender according to claim 8, wherein the processor is further configured to append a command Identifier (ID) that uniquely identifies the control command packet into the control command packet for sending.

10. The sender according to claim 9, wherein the processor is further configured to perform the sending to one or more receivers in a Peer-to-Peer (P2P) manner, to acquire an Internet Protocol (IP) address of the receiver or a list of IP addresses of the receivers, and to send the control command packet to the IP address of each of the one or more receivers.

11. The sender according to claim 10, wherein the processor is further configured to, when failing to receive the ACK packet from the receiver within a preset time period, resend the control command packet to the receiver; and wherein the processor is further configured to, when receiving the ACK packet from the receiver within the preset time period, determine that sending the control command packet is successful, and when failing to receive the ACK packet after sending the control command packet to the receiver for N times, determining that sending the control command packet to the receiver has failed.

12. The sender according to claim 8, wherein the processor is further configured to perform the sending to multiple receivers, and append a group ID into the control command packet for sending, and wherein the processor is further configured to acquire a broadcast or multicast group address, and to send the control command packet in the broadcast or multicast manner.

13. The sender according to claim 12, wherein the processor is further configured to, when failing to receive the ACK packets from all the receivers within a preset time period, resend the control command packet in the broadcast or multicast manner; and wherein the receiving module is further configured to, when receiving the ACK packets from all the receivers within the preset time period, determining that sending the control command packet is successful, and when failing to receive the ACK packets from all the receivers after sending the control command packet in the broadcast or multicast manner for N times, determining that sending the control command packet to the one or more receivers that have not sent the ACK packets has failed.

14. A User Datagram Protocol (UDP)-based control command receiver, comprising:

a memory; and a processor configured to execute a series of actions by performing instructions stored in the memory, including:

to receive a control command packet from a sender;

to send an Acknowledgement (ACK) packet to the sender to indicate the control command packet was successfully received in a broadcast or multicast manner; and to append a unique identifier of the receiver into the ACK packet for sending such that, when the control command packet and the ACK packet are transmitted in the broadcast or multicast manner, the unique identifier of the receiver is configured to distinguish the receiver that sends the ACK packet.

15. The receiver according to claim 14, wherein the processor is further configured to append a command Identifier (ID) consistent with that in the received control command packet into the ACK packet for sending.

16. The receiver according to claim 15, wherein the processor is further configured to, during Peer-to-Peer (P2P) sending, acquire an Internet Protocol (IP) address of the sender corresponding to the received control command packet and send the ACK packet to the address.

17. The receiver according to claim 15, wherein the processor is further configured to, during broadcast or multicast sending, (i) acquire a group ID consistent with that in the received control command packet, (ii) append the group ID into the ACK packet, (iii) acquire the IP address of the sender or a broadcast or multicast group address corresponding to the received control command packet, and (iv) send the ACK packet to the address or the broadcast or multicast group address.

* * * * *